(12) United States Patent
Janz

(10) Patent No.: US 6,726,287 B1
(45) Date of Patent: Apr. 27, 2004

(54) BELT DEFLECTOR ON A SEAT

(76) Inventor: Norbert Janz, Starstrasse 21, 14612 Falkensee (DE)

( * ) Notice: Subject to any disclaimer, the term of this patent is extended or adjusted under 35 U.S.C. 154(b) by 0 days.

(21) Appl. No.: 10/349,985

(22) Filed: Jan. 23, 2003

(30) Foreign Application Priority Data

Nov. 2, 2002 (DE) ............................. 102 51 081

(51) Int. Cl.[7] ............................................. B60R 22/48
(52) U.S. Cl. ................... 297/483; 297/473; 297/216.13
(58) Field of Search ................. 297/483, 472, 297/473, 482, 463.1; 280/808, 801.2, 801.1

(56) References Cited

U.S. PATENT DOCUMENTS

| | | | | |
|---|---|---|---|---|
| 4,323,278 A | * | 4/1982 | Sukopp et al. ............... 297/481 |
| 5,149,135 A | * | 9/1992 | Konishi et al. ............. 280/806 |
| 5,263,741 A | * | 11/1993 | Seros et al. ................ 280/808 |
| 5,733,013 A | * | 3/1998 | Brown ........................ 297/483 |
| 5,823,627 A | * | 10/1998 | Viano et al. ................ 297/471 |
| 5,897,169 A | * | 4/1999 | Larsen et al. .............. 297/483 |
| 6,082,823 A | * | 7/2000 | Aumont et al. ........... 297/452.2 |
| 6,502,861 B2 | * | 1/2003 | Specht ....................... 280/808 |
| 6,520,588 B1 | * | 2/2003 | Busch ........................ 297/483 |

FOREIGN PATENT DOCUMENTS

| | | | |
|---|---|---|---|
| DE | 100 35 148 | | 1/2002 |
| FR | 2816874 | * | 5/2002 |
| JP | 6-255445 | * | 9/1994 |

* cited by examiner

*Primary Examiner*—Laurie K. Cranmer
(74) *Attorney, Agent, or Firm*—Collard & Roe, P.C.

(57) ABSTRACT

A belt deflector on a seat, with a sheet-metal element connected with a seat sub-structure of the seat, which has a belt path surface structured as a saddle. The saddle has a ridge region that is rounded off in the belt path direction, and ears molded onto it in the crosswise direction, on the side, which are formed in sickle shape as lateral belt path restrictors, and are structured with rounded belt guidance surfaces in the belt path direction. The free ends of the sickle-shaped, formed ears extend over at least the border regions of the belt path surface.

12 Claims, 5 Drawing Sheets

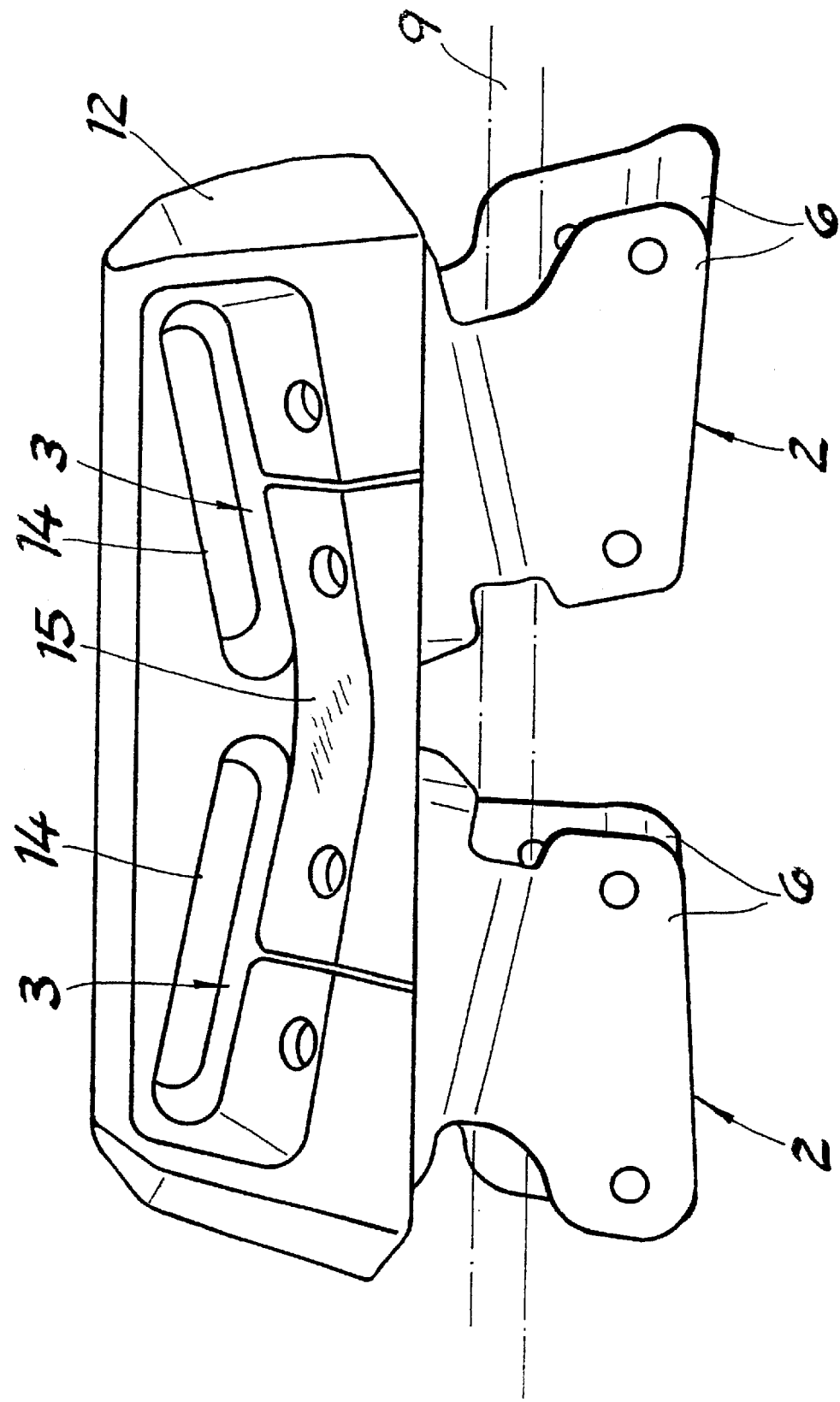

BELT DEFLECTOR ON A SEAT

BACKGROUND OF THE INVENTION

The invention relates to a belt deflector on a seat, particularly on a vehicle seat. This belt deflector has a sheet-metal element that is connected with the seat's sub-structure, which has a belt path surface structured as a saddle.

In motor vehicles that have a seat bench for several persons, side doors that slide, such as buses, and in vehicles without a roof, such as convertibles and beach vehicles, belt deflectors that are attached to the vehicle seat are required to guide safety belts. The belt deflector is supposed to guide the safety belt so that the belt is easy to handle and rests comfortably against the body. The belt deflector must not represent a risk and, in particular, the belt deflector must prevent head injuries during an accident or crash.

The Prior Art

A belt deflector with the characteristics described initially is known from German Patent No. 100 35 148 A1. In this disclosure, lateral elevations are molded onto the belt path region to center the movement of the belt. Furthermore, a stirrup is arranged above the belt path surface, in the ridge region of the saddle, to delimit a belt slot. This stirrup is attached on both faces of the saddle. In case of improper handling, and particularly also in case of a crash, there is the risk that the safety belt will slip off the belt path surface and will jam between the stirrup and the sheet-metal element. Proper function of the belt is then no longer assured. Furthermore, there is the risk that the belt will be damaged.

SUMMARY OF THE INVENTION

The invention is based on the task of creating a belt deflector for a vehicle seat which has a simple structural design and assures proper guidance of the belt in cases of improper handling and crash.

Essentially, the saddle has a ridge region that is rounded off in the belt path direction. The saddle also has ears molded onto it in the crosswise direction, on the side, which are formed in sickle shapes as lateral belt path restrictors. This device also has rounded belt guidance surfaces in the belt path direction, whereby the free ends of the sickle-shaped ears extend over at least the border regions of the belt path surface.

The lateral belt path restrictors are molded on, in one piece, in the ridge region of the sheet-metal element. Production takes place via cold-forming methods. The belt path restrictors with a sickle-shaped structure have a domed belt guidance surface that is adapted to the curvature of the ridge region. The belt path restrictors that are structured in sickle shape and perpendicular to the belt path direction extend over at least the border regions of the belt path surface. The distance between the free ends of the sickle-shaped belt path restrictors is preferably smaller than the width of the belt being guided on the belt path surface. In addition, with this design, a separate stirrup for guiding the belt and for delimiting a belt slot is no longer required.

According to a preferred embodiment of the invention, the sheet-metal element has tabs connected at the faces of the saddle for reinforcement, as well as foot elements structured as sheet-metal tabs for attachment to the seat sub-structure. Thus, it is practical if the foot elements are attached at a cross-bar of the seat sub-structure wherein the face tabs of the sheet-metal element are spaced apart from the cross-bar. The foot elements are dimensioned so that they bend out under the stress that occurs during a crash situation, whereby the sheet-metal element drops down until the face tabs make contact with the cross-bar. Because the sheet-metal element drops down under the belt stress that occurs during an accident, the distance between the belt deflector and the head of the seat-belted person increases. As a result, the risk of head injuries is reduced. Furthermore, the deformation of the foot elements has an advantageous effect on the introduction of the hold-back forces into the body of the seat-belted person.

The belt deflector can be attached at any desired point along a cross-bar of the seat sub-structure, specifically as required by the Installation situation in a fixed case. The connection should be made so that the ridge region of the saddle is aligned at a slant to the cross-bar, as determined by the belt path. Preferably, the saddle is structured to be steep on the belt feed side and to have a slide surface with a slant that follows the belt take-off, on the belt take-off side.

In another embodiment, the invention teaches that the foot element on the belt feed side has a shape that has a domed cross-section. This foot element extends as a projecting deflection surface that is perpendicular to the belt path direction. The shape of the foot element forms another deflection surface, which is practical if the safety belt runs upward steeply, following the seat sub-structure.

The sheet-metal element can have an anti-friction coating that reduces the friction resistance. An anti-friction coating made of a fluoride polymer matrix and reinforcement substances embedded in it, with a layer thickness of less than 100 $\mu$m, is preferred. While the fluoride polymer matrix of the anti-friction coating imparts sufficient temperature resistance, the embedded, preferably particulate reinforcement substances assure sufficient anti-wear resistance. Because of the low layer thickness of less than 100 $\mu$m, preferably 15 to 80 $\mu$m, this assures good heat transfer to the metal body, and this in turn has an advantageous effect on the heating of the running surface that occurs in case of a crash. Furthermore, the coating described has a lower noise emission when the belt is pulled out, in comparison with plastic sheathing or chrome-plating.

While the foot elements of the belt deflector are structured so that they bend out under the belt stresses that occur in an accident, the saddle is supposed to possess a high degree of shape stability. The tabs provide an essential reinforcement function wherein they are formed onto the faces of the saddle and connected with one another. It is practical if they are connected by means of rivets.

Both for aesthetic or visual reasons and to avoid the risk of injury, the belt deflector that is attached to the vehicle seat is covered with preferably shock-absorbing material. This results in various design possibilities. One embodiment provides that the foot elements as well as a bottom segment of the saddle are surrounded by an upholstery of the vehicle seat, whereby the ridge region of the sheet-metal element projects out of the upholstery of the vehicle seat. A plastic cap can be set onto the segment that projects out of the upholstery on the belt feed side and belt take off side. The cap has a belt eye for the safety belt to pass through. An alternative embodiment includes a plastic cap that covers the belt feed arranged above the sheet-metal element, whereby the safety belt can be fed in at the bottom of the plastic cap and exits out of a belt opening of the plastic cap, after having been deflected on the saddle of the sheet-metal element. The plastic cap can be integrated into a paneling of the vehicle seat, whereby the feed of the safety belt is also disposed within the seat paneling. Attachment holes for the plastic cap are arranged in the saddle and/or at the faces of the sheet-metal element. According to a preferred embodiment of the invention, the plastic cap attached to the sheet-metal element contains an assembly opening on the saddle side, which can be closed off with a plastic insert.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views:

FIG. 5 is another embodiment of the belt deflector.

DETAILED DESCRIPTION

Figure 1:
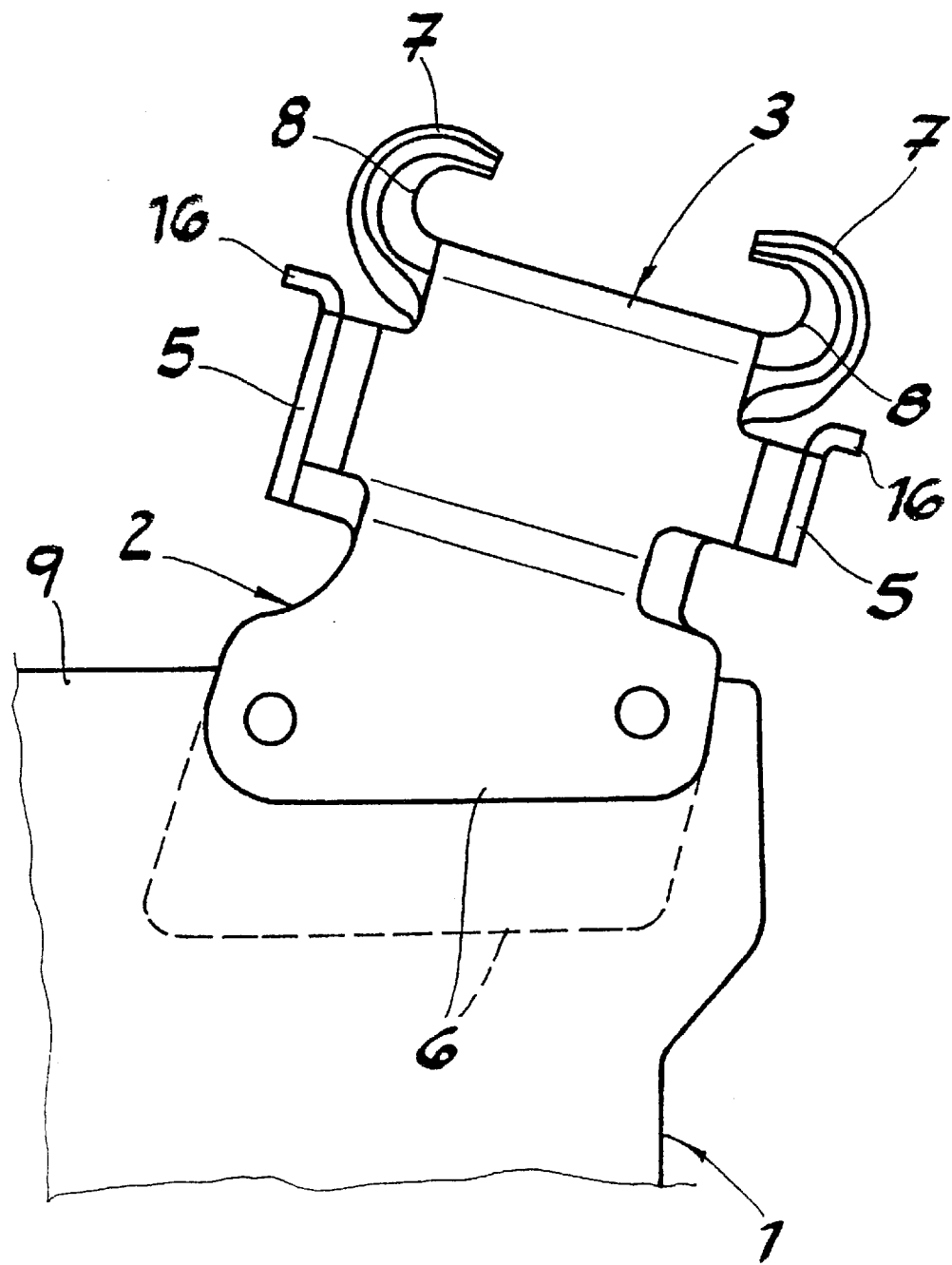
FIG. 1 is a front view of a belt deflector on the seat sub-structure of a vehicle seat.

Referring in detail to the drawings, FIG. 1 shows a belt deflector which is mounted onto a vehicle seat of a motor vehicle. An essential component of the belt deflector is a sheet-metal element 2 that is connected with a seat sub-structure 1 of the vehicle seat, wherein the body has a belt path surface, structured as a saddle 3. Belt path surface or saddle 3 is for a safety belt 4 (see FIG. 2) that comes from a belt retractor and travels in a belt path shown by the arrows in FIG. 2. There are also tabs 5 that are connected with the faces of saddle 3 for reinforcement, and foot elements 6 that project at the bottom.

Saddle 3 has a ridge region that is rounded off in the belt path direction, and sickle-shaped ears 7 that are molded on at the sides, in a crosswise direction. These ears 7 are formed as lateral belt path restrictors. In addition, ears 7 are structured with rounded belt guidance surfaces 8 in the belt path direction. The free ends of sickle-shaped ears 7 extend over at least the border regions of belt path surface or saddle 3. Ears 7 are molded on in one piece, by means of sheet-metal deformation, and have a high level of shape rigidity and assure proper guidance of safety belt 4 on belt path surface or saddle 3, even in extreme situations, because of their structure.

Figure 2:
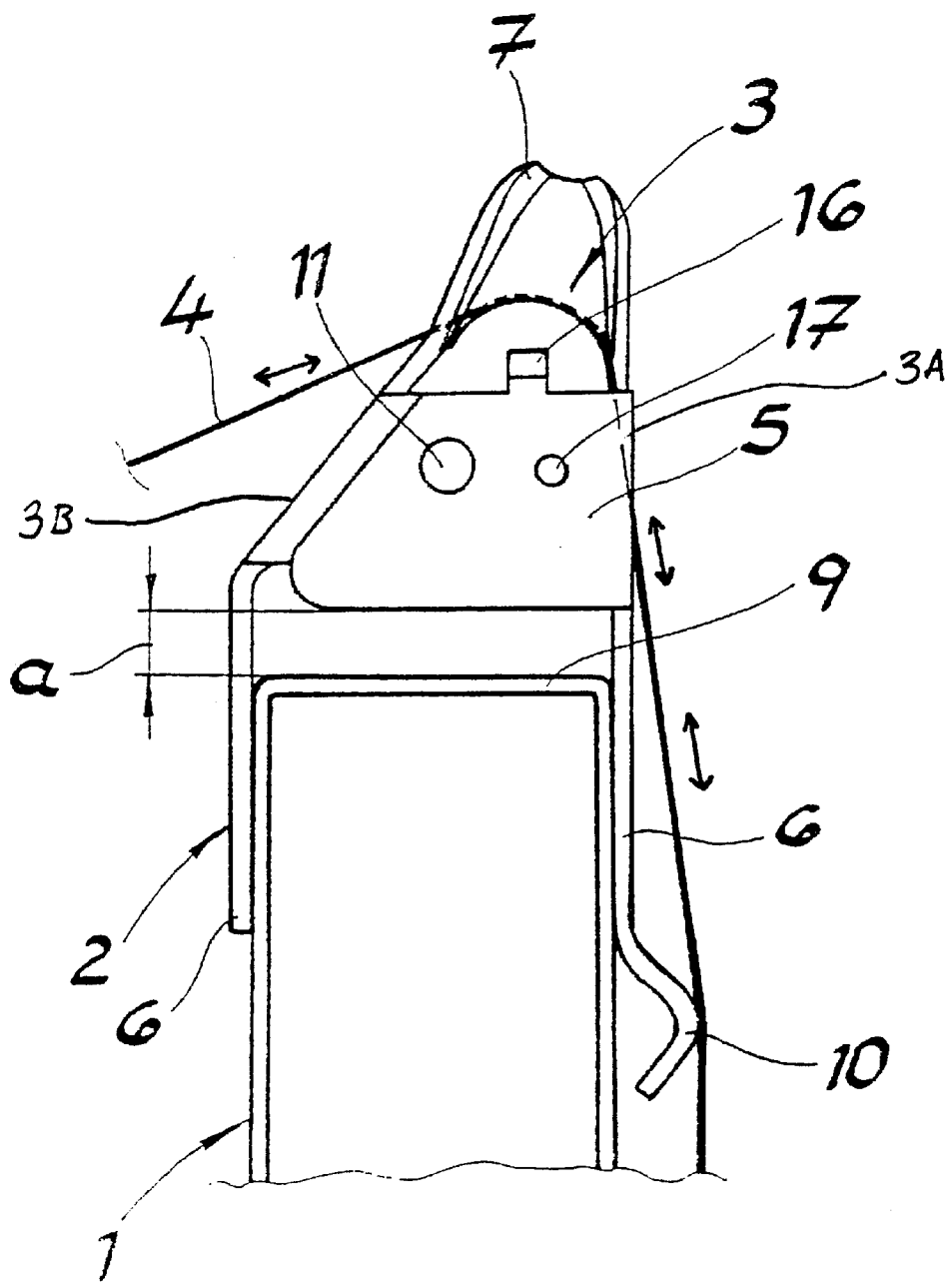
FIG. 2 is a face view of the object shown in FIG. 1.

The ridge region of saddle 3 is aligned at a slant with respect to a cross-bar 9 of the seat sub-structure, as determined by the belt path. FIG. 2 shows saddle 3 is structured to be steep on the belt feed side 3A and has a slide surface with a slant that follows the belt take-off, on the belt take-off side 3B. Foot element 6 can furthermore have a structure 10 that has a domed cross-section, and extends perpendicular to the belt path direction, as a projecting deflection surface. No additional guide elements are required to guide safety belt 4 between structure 10 that serves as a slide and deflection surface, and a belt retractor arranged in the foot region of the seat.

Foot elements 6 are structured as sheet-metal tabs or foot tabs and are arranged on both sides of cross-bar 9 of seat sub-structure 1. Foot elements 6 are attached to cross-bar 9 so that face tabs 5 of sheet-metal element 2 are at a distance from cross-bar 9, which can be between 5 mm and 20 mm. Foot elements 6 are dimensioned so that they bend out under the belt stress that occurs during an accident, whereby sheet-metal element 2 drops down, until the faces of saddle 3 make contact with cross-bar 9 of the seat sub-structure.

Because the movement of sheet-metal element 2 is directed downward in a crash situation, the distance between the belt deflector and the head of the seat-belted person increases. This reduces the risk of head injuries. At the same time, the deformation of foot elements 6 has an advantageous effect on the introduction of the hold-back forces into the body of the seat-belted person. While deformability of foot elements 6 is desirable, saddle-shaped sheet-metal element 2 is supposed to possess a high level of shape stability. Thus, tabs 5 formed on the faces of saddle 3 are connected with one another via rivets 11.

Sheet-metal element 2 can have an anti-friction coating that reduces the friction resistance. Preferably, the anti-friction coating consists of a fluoride polymer matrix and reinforcement substances embedded in it, and has a layer thickness of less than 10 $\mu$m. For visual or aesthetic reasons, and to further minimize the risk of injury, the belt deflector is covered with a plastic cap 12, which can be made of a shock-absorbing plastic.

Figure 3:
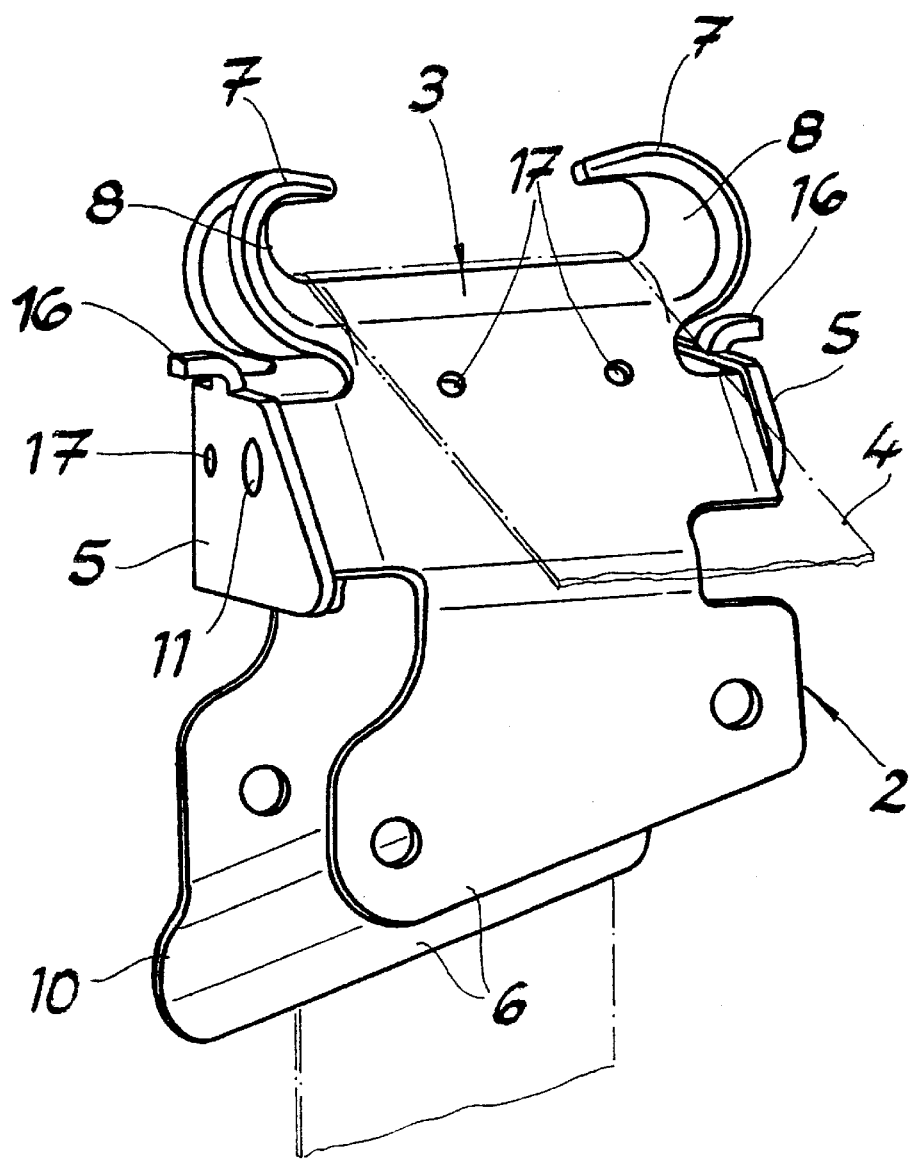
FIG. 3 is a perspective view of the object of FIG. 1 and 2.
Figure 4:
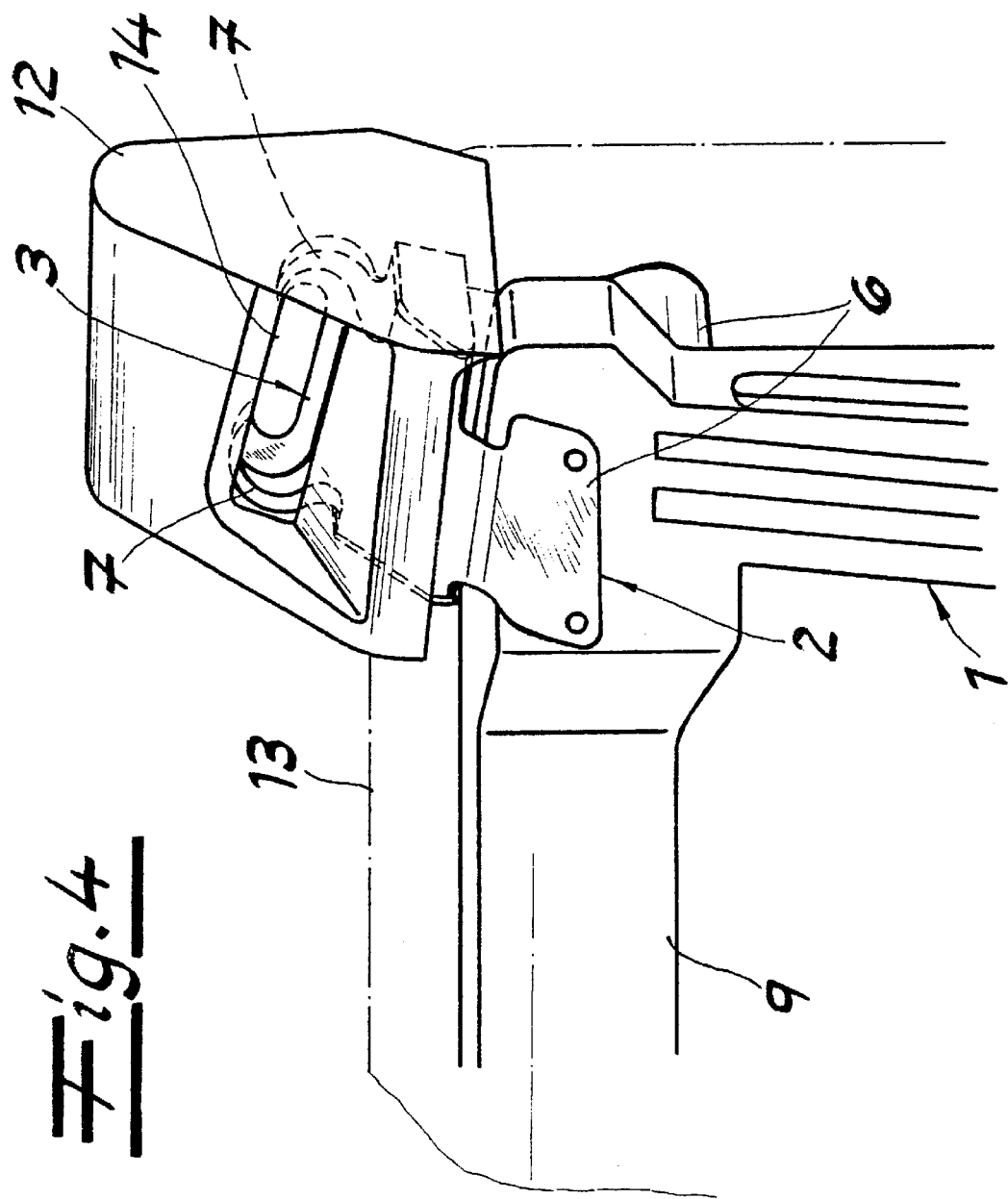
FIG. 4 is a view of the device of FIG. 1 installed on a vehicle seat.

FIG. 3 which is a perspective view of the device shown in FIGS. 1 and 2, shows attachment holes 17 on sheet-metal element 2 wherein these attachment holes can be used to attach a plastic cap as shown in FIG. 4.

In the embodiment shown in FIG. 4, foot elements 6 and a bottom segment of saddle 3 are surrounded by an upholstery 13 of the vehicle seat, whereby the ridge region of sheet-metal element 2 projects out of upholstery 13 of the vehicle seat. Above sheet-metal element 2, a plastic cap 12 that covers the belt feed is disposed, whereby safety belt 4 can be fed in at the bottom of plastic cap 12 and exits out of a belt opening 14 of the plastic cap 12, after having been deflected on saddle 3 of sheet-metal element 2. The feed of the safety belt is disposed within the seat paneling.

The belt deflector shown in FIG. 5 is suitable for belt guides on a double seat or on a seat bench. Two sheet-metal elements 2 with the structure described above are arranged next to one another on cross-bar 9 of the seat sub-structure. A plastic cap 12 is arranged above two sheet-metal elements 2. It has an assembly opening on the saddle side, which can be closed off with a plastic insert 15.

The belt deflector has brackets 16 (See FIG. 3) connected to the face of sheet-metal element 2, for positioning plastic cap 12. Plastic cap 12 can be attached via screws. Attachment holes 17 for plastic cap 12 are disposed in the saddle and on the faces of sheet-metal element 2. However, plastic cap 12 can be connected to sheet-metal element 2 via other means as well.

Accordingly, while at least one embodiment of the present invention has been shown and described, it is to be understood that many changes and modifications may be made thereunto without departing from the spirit and scope of the invention as defined in the appended claims.

What is claimed is:

1. A belt deflector for a seat having a seat substructure comprising:
   a) a sheet metal element coupled to the seat sub structure;
   b) a saddle, formed on an end of said sheet metal element as a belt path surface for allowing a belt to travel over in a bolt path, wherein said saddle has a ridge region that is rounded off in a direction of a belt in said belt path and has side faces;

c) a plurality of ears molded onto said sheet metal element in a crosswise direction, wherein said plurality of ears are formed in a sickle shape as lateral belt path restrictors, and wherein said ears have rounded belt guidance surfaces wherein free ends of said plurality of ears extend over border regions of said belt path surface;

d) a plurality of tabs coupled to said sheet metal element on said side faces of said saddle; and e) a plurality of foot elements formed as tabs integral with said sheet metal element, wherein said plurality of foot elements are coupled to a cross bar of the seat sub structure, and wherein said plurality of foot elements are spaced a defined distance from said cross bar.

2. The belt deflector as in claim 1, wherein said ridge region of said saddle is aligned at a slant to said cross bar as determined by said belt path.

3. The belt deflector as in claim 1, wherein said saddle is structured to form a steep slope surface on a belt take off side.

4. The belt deflector as in claim 1, wherein at least one foot element of said plurality or foot elements has a domed shaped cross-section which extends as a projecting deflection surface perpendicular to said belt path.

5. The belt deflector as in claim 1, wherein said sheet metal element has an anti-friction coating that reduces friction resistance.

6. The belt deflector as in claim 5, wherein said anti-friction coating comprises a fluoride polymer matrix having reinforcement substances disposed on it, and wherein said anti-friction coating has a layer thickness of less than 100 $\mu$m.

7. The belt deflector as in claim 6, further comprising a plurality of tabs molded onto said saddle and further comprising a plurality of rivets wherein said plurality of tabs are connected to each other by means of said plurality of rivets.

8. The belt deflector as in claim 1, wherein said plurality of foot elements and a bottom segment of said saddle are surrounded by an upholstery of the vehicle seat, wherein a said ridge region of said sheet metal element projects out of said upholstery of the vehicle seat.

9. The belt deflector an in claim 8, further comprising a plastic cap that has a belt opening and that covers a belt feed that is coupled to and arranged above said sheet metal element, wherein a safety belt can be fed in at a bottom of the plastic cap and exits out of paid belt opening of said plastic cap after having been deflected on said saddle of said sheet metal element.

10. The belt deflector as in claim 9, wherein said sheet metal element and said saddle further comprise attachment holes which are arranged on said saddle and also on said faces of said sheet-metal element allowing said plastic cap to be attached to said sheet-metal element.

11. The belt deflector as in claim 10, further comprising a plastic insert, wherein said plastic cap which is attached to said sheet metal element comprises an assembly opening on a saddle side which can be closed off with said plastic insert.

12. The belt deflector as in claim 1, wherein said saddle has a belt path surface comprising a belt feed side and a bolt take-off side, and said tabs are positioned on said saddle extending substantially perpendicular to said belt feed side and said belt take off side.

* * * * *